F. LEADBEATER.
VALVE.
APPLICATION FILED JAN. 8, 1912.
1,031,652.
Patented July 2, 1912.
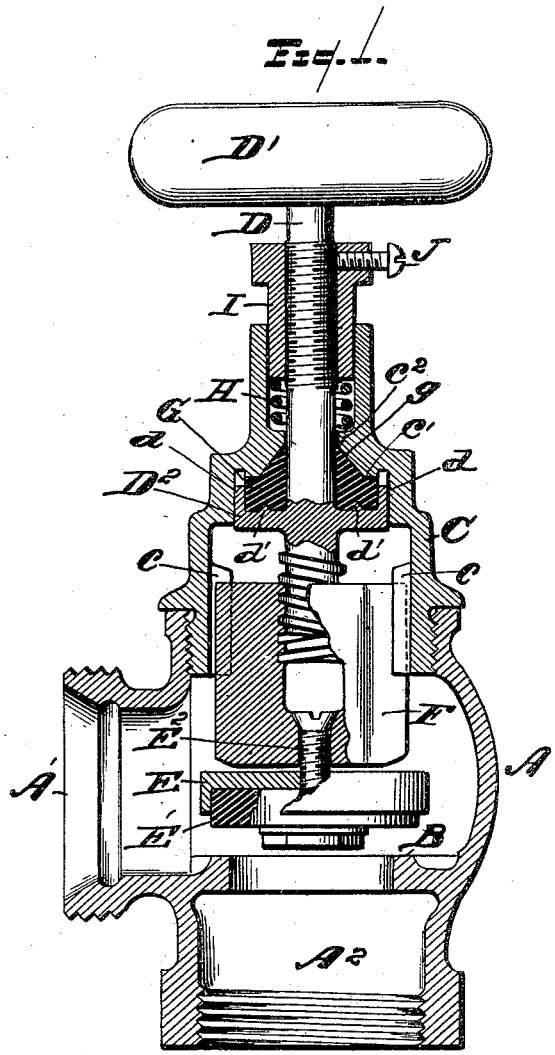
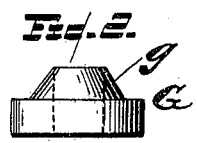
Witnesses
Grace E. Wynkoop.
Clara Rankin.
Inventor
Frederick Leadbeater
By S. E. Thomas
Attorney

UNITED STATES PATENT OFFICE.

FREDERICK LEADBEATER, OF DETROIT, MICHIGAN.

VALVE.

1,031,652.

Specification of Letters Patent.

Patented July 2, 1912.

Application filed January 8, 1912. Serial No. 669,910.

*To all whom it may concern:*

Be it known that I, FREDERICK LEAD-BEATER, citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates to an improvement in valves, shown in the accompanying drawings and more particularly set forth in the following specification and claims.

My invention is more especially designed as an improvement over United States Patent granted to me on the 3rd day of May, 1910, No. 956,811, one of the objects of the present invention being to provide an inexpensive valve simple in its construction but effective in its operation and formed of a less number of parts than that described in the patent referred to.

One feature of my invention is the elimination of the usual stuffing box around the valve stem, a steam tight joint being secured by providing the valve stem with a disk adapted to be drawn to a seat formed in the wall of the bonnet, the disk providing an extended surface along the stem so constructed and arranged that it may be forced into intimate relation therewith.

Another feature of the invention consists in providing an adjustable nut mounted on the stem adapted to regulate the tension of a spring for maintaining the disk upon its seat,—the construction being such that it may be adjusted without removing any of the parts.

Other advantages and improvements will hereafter appear.

In the drawings accompanying this specification:—Figure 1 is a central sectional view through the valve, with parts broken away and in elevation. Fig. 2 is a side elevation of a disk sleeved on the valve stem.

Referring now to the letters of reference placed upon the drawings:—A denotes the body of a valve; B its seat; C the valve bonnet having the usual screw-threaded connection with the valve body.

D indicates the valve stem, and D' a handle for operating the valve stem.

E denotes a valve, and E' a valve disk formed of suitable material.

F is a traveling nut having a screw-threaded engagement with the lower end of the valve stem D, it being free to reciprocate on the stem but held against rotation by the guides $c$ projecting from the inner wall of the bonnet C.

$E^2$ is a bolt connecting the valve with the nut F.

$D^2$ is a flange projecting from the valve stem having an upstanding annular rim $d$.

G is an annular disk preferably formed of composition or metallic packing, sleeved on the stem and housed within the upstanding rim of the flange $D^2$.

$d'$ is an annular V-shaped rib projecting from the flange $D^2$ into a recess provided for its reception in the disk G. The upper wall of the disk G near its outer periphery is formed with a flat or horizontal surface adapted to bear against the annular seat $c'$ depending from the inner wall of the bonnet.

The disk G is formed with a cone-shaped portion $g$ providing an extended bearing surface along the valve stem:—against the outer face of which the inwardly projecting flange portion $c^2$ of the bonnet bears to force the disk into sealing contact with the valve stem.

H is a spring sleeved on the valve stem and housed within the recess provided for its reception in the upper part of the bonnet.

I is an adjustable nut having a screw-threaded engagement with the valve stem, the threads preferably running in the opposite direction to those engaging the traveling nut.

J is a set screw carried by the nut adapted to bear against the stem to secure the nut against accidental displacement when adjusted.

Having indicated the several parts by reference letters, the construction and operation of the valve will be readily understood.

By operating the handle D' in the usual manner, the valve E may be raised, or forced to its seat B through the action of the traveling nut F; the passage through the ports A' and $A^2$ being thus controlled. By adjusting the nut I, the tension of the spring H may be regulated and the disk G held upon its seat $c'$. The spring H co-acting with the nut I and the flange portion $c^2$ serves to force the cone-shaped portion of the disk G into sealing contact with the valve stem thus providing against leakage of the valve around the stem.

By forming the flange $D^2$ with an upstanding rib $d'$ the joint between the disk and flange is broken to further assist in insuring a tight joint.

Having thus described my invention, what I claim is:—

1. In a valve, a body portion provided with a valve seat, a stem for actuating the valve, a flange integral with the stem, a disk carried by said flange having a cone-shaped upper wall tapering toward the stem, a bonnet secured to the body portion through which the stem projects having an annular seat to receive the disk and with a projecting flange adapted to bear against the cone-shaped upper wall of the disk to force it toward the stem, a spring housed within the bonnet and sleeved upon the stem to force the flange to its seat, and an adjustable nut engaging the stem to regulate the tension of the spring.

2. In a valve, a body portion provided with a valve seat, a valve stem having two independently screw-threaded portions, a flange integral with the stem, a packing disk carried by said flange having a cone-shaped upper wall tapering toward the stem, a bonnet secured to the body portion through which the stem projects having an annular seat to receive the disk carried by the flange of the stem, a screw-threaded traveling nut adapted to reciprocate upon the stem, guides integral with the body portion to secure the nut against rotation with the stem, a valve connected with the nut to control the ports through the valve body, a spring housed within the bonnet and sleeved upon the stem to force the disk to its seat, and an adjustable nut mounted upon the stem adapted to regulate the tension of the spring.

3. In a valve, a body portion provided with a valve seat, a valve stem having two independently screw-threaded portions, a flange integral with the stem with an annular rib on its upper face, a disk carried by said flange recessed to receive the rib and formed with a cone-shaped upper wall tapering toward the stem, a bonnet secured to the body portion through which the stem projects having an annular seat to receive the disk and provided with a flange adapted to bear against the cone-shaped wall of the disk to crowd it into contact with the stem, a screw-threaded traveling nut adapted to be reciprocated on the stem by rotating the latter, guides integral with the body portion to secure the nut against rotation with the stem, a valve connected to the traveling nut, a spring housed within the bonnet and sleeved upon the stem to force the disk to its seat, and an adjustable nut engaging the stem to regulate the tension of the spring.

In testimony whereof, I sign this specification in the presence of two witnesses.

FREDERICK LEADBEATER.

Witnesses:
GRACE E. WYNKOOP,
SAMUEL E. THOMAS.